INVENTORS
REA I. HAHN
BERNARD E. FRANK
HENRY D. MOWERS
BY Spencer Hardman & Fehr
THEIR ATTORNEYS United States Patent Office 2,998,125
Patented Aug. 29, 1961

2,998,125
TUBE SIZING MACHINE
Rea I. Hahn, Racine, Wis., and Bernard E. Frank and Henry D. Mowers, Rochester, N.Y., assignors to General Motors Corporation, Detroit, Mich., a corporation of Delaware
Continuation of application Ser. No. 112,791, Aug. 27, 1949. This application May 22, 1957, Ser. No. 660,962
3 Claims. (Cl. 205—7)

This invention relates to the manufacture of articles from cut lengths of tubing and its object is to provide a method and machine for sizing the inside and outside diameters of an end portion of a piece of tubing and for removing burs with minimum strain on the sizing tools, and is a continuation of Serial No. 112,791, filed August 27, 1949, now abandoned. The method comprises advancing around the end portion of tubing a die having an aperture defined by an O.D. sizing surface or land and surfaces flaring outwardly therefrom while moving into the tubing a punch, having an expanding land of diameter greater than the original I.D. of the tubing and located with respect to advancing movement posterior to the O.D. sizing land of the die, to cause the tubing to expand to an O.D. greater than that of the sizing land of the die, and retracting the die and punch from the tubing to cause it to be contracted to an O.D. determined by the sizing land of the die, the punch, on retracting, smoothing out irregularities on the interior of the sized portion of the tubing and removing burs at the interior edge thereof.

When it is necessary to size the tubing to an I.D. within relatively narrow limits, the punch is caused to remain substantially fixed during retraction of the die until the O.D. sizing land of the die immediately surrounds the I.D. sizing land of the punch; and, then retraction of the die and punch continues together as a unit so that the tubing is forced between the sizing lands of the die and punch.

If the I.D. of the tubing need not be held within narrow limits, the punch remains, during retraction, in the same position relative to the die as it occupied during advancing movement of the die. This position is such that the punch is located within that outwardly flaring surface of the die which, with respect to advancing movement of the die, is posterior to the O.D. sizing surface or land of the die, and the distance between the middle of the O.D. sizing land of the die to about the middle of the expanding land of the punch is approximately equal to the original O.D. of the tubing, the shortest distance between the expanding land of the punch and the surrounding flaring surface of the die being slightly greater than the wall thickness of the tubing when expanded by the punch.

A further object of the invention is to provide a tubing sizing machine which can be adapted to operate on pieces of tubing of various lengths.

Further objects and advantages of the present invention will be apparent from the following description, reference being had to the accompanying drawings, wherein a preferred embodiment of the present invention is clearly shown.

Referring to FIGS. 1 through 4, the supporting frame work of the machine comprises leg castings 21 and 22 connected near the bottom by a channel 23 and at their tops by bars 24 and 25 supporting rails 26 and 27, respectively.

Figure 1:
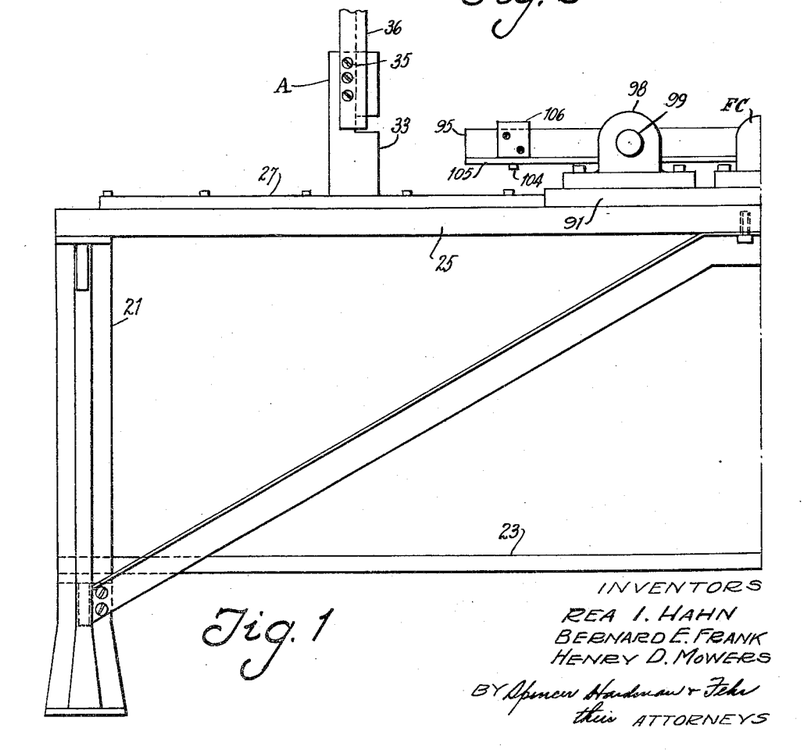
FIGS. 1 and 2 comprise a side view of the machine.
Figure 2:
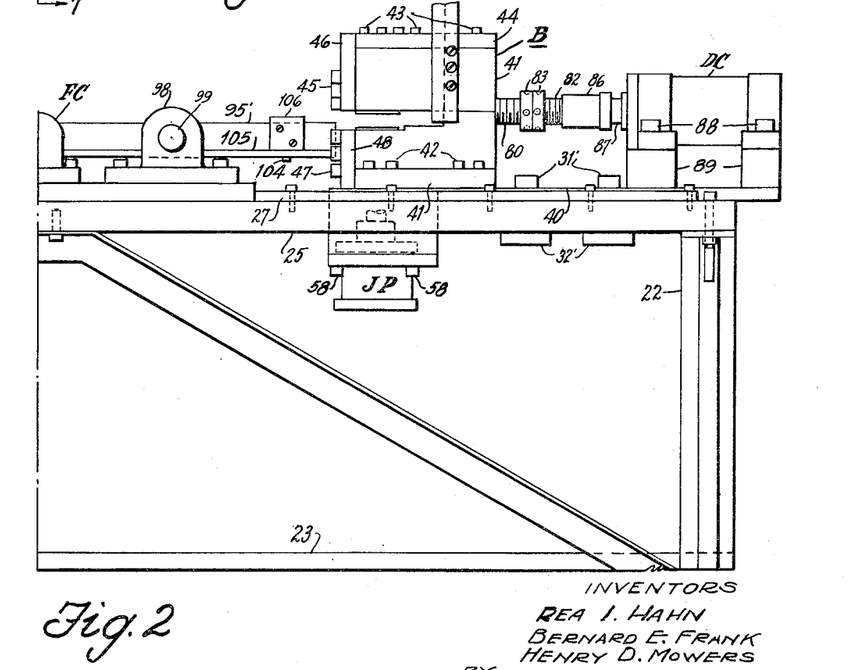
Figure 3:
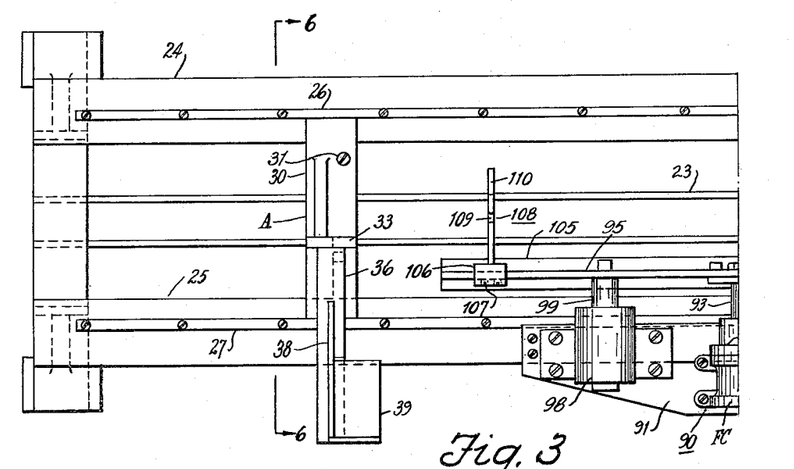
FIGS. 3 and 4 comprise a top view of the machine.
Figure 4:
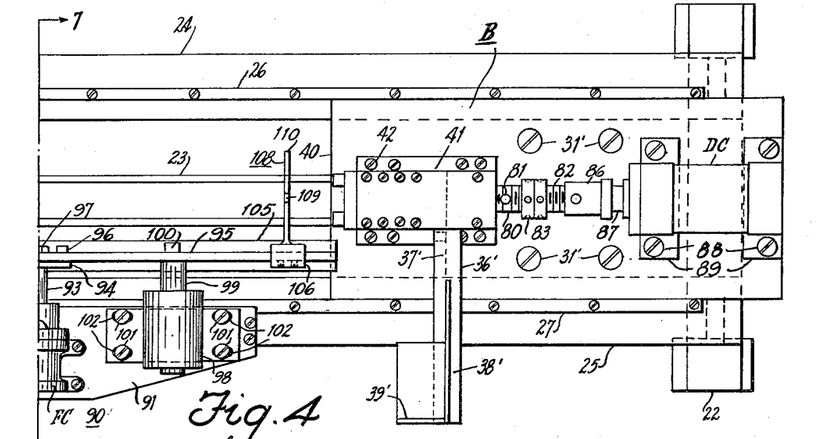
Figures 6, 14:
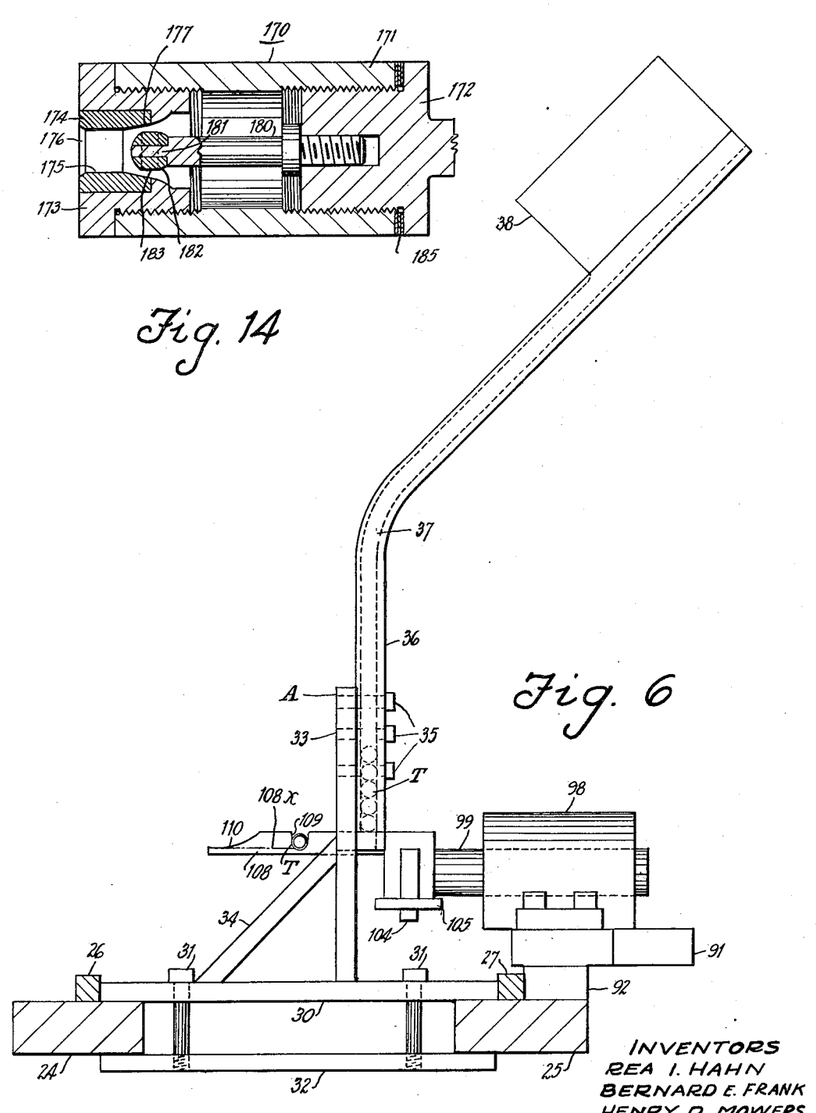
FIG. 6 is a sectional view on the line 6—6 of FIG. 3.
FIG. 14 (on sheet 4 with FIG. 6) is a longitudinal sectional view of a modification drawn to the same scale as FIG. 12.

Referring to FIGS. 1, 3 and 6, bars 24 and 25 support a subassembly unit A which includes a plate 30 which is guided for movement along the bars by the rails 26 and 27 into a desired position in which it is secured by screws 31 which pass through a plate 30 and threadedly engages plate 32. A post 33 is welded to the plate 30 and a brace 34 is welded to parts 30 and 33. Screws 35 attach to post 33 a magazine chute 36 providing a channel 37 for receiving end portions of pieces of tubing. To assist in guiding the tubing into the channel 37, the chute 36 supports plates 38 and 39 which are welded thereto (FIG. 3).

Figures 9, 10, 11, 12:
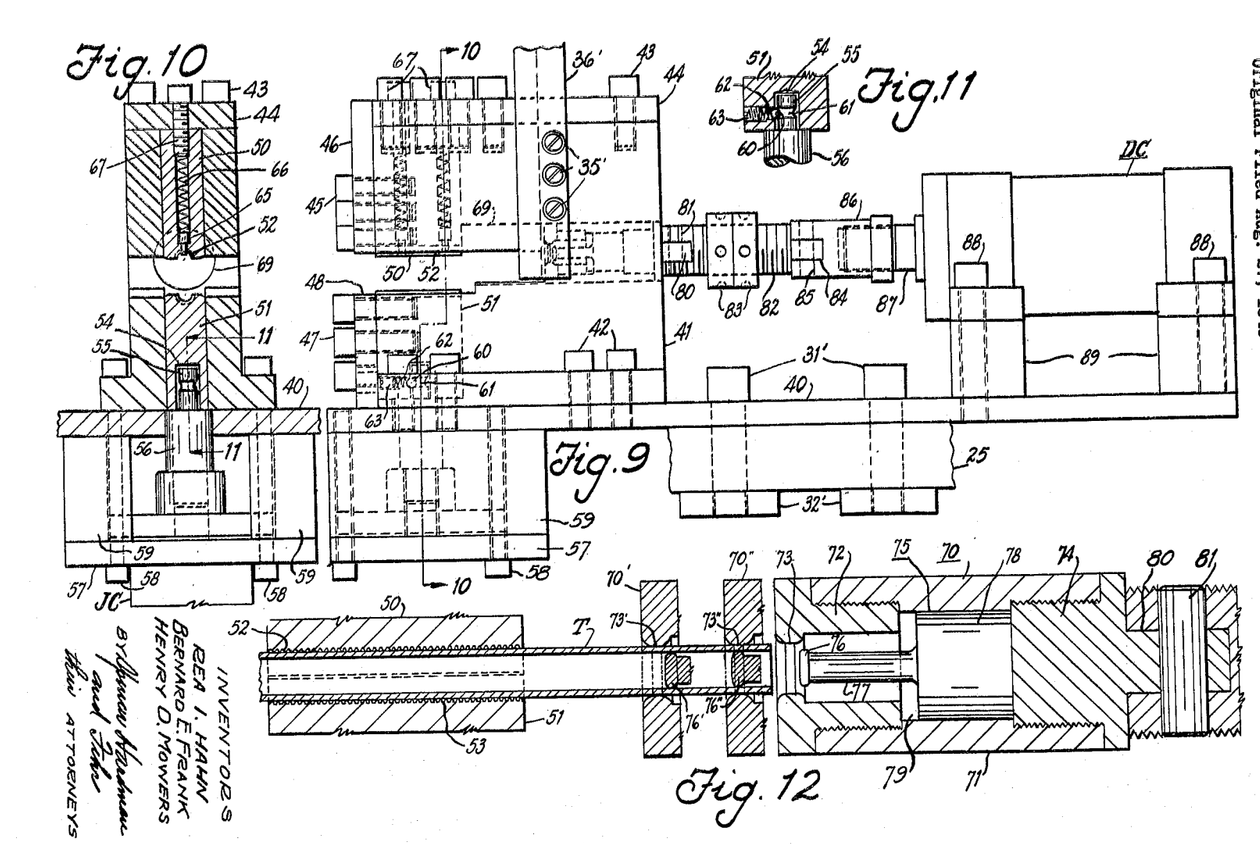
FIG. 9 is a view in the direction of arrow 9 of FIG. 8.
FIG. 10 is a sectional view on line 10—10 of FIG. 9.
FIG. 11 is a sectional view on line 11—11 of FIG. 10.
FIG. 12 is a fragmentary sectional view on line 12—12 of FIG. 8, and is drawn to a larger scale.

Referring to FIGS. 2, 4, 7 and 8, there is a subassembly unit B which includes a plate 40 which is supported by bars 24 and 25 and is shiftable between guide rails 26 and 27 into a desired position in which it is secured by screws 31' and bars 32' (FIG. 9) in the same manner as plate 30 in FIG. 6. Plate 40 supports a frame 41 secured by screws 42. Frame 41 supports a chute member 36' having parts 37', 38' corresponding to similarly numbered parts of chute 36 in FIG. 6. To the frame 41, screws 43 secure a plate 44, screws 45 secure a plate 46 and screws 47 secure a plate 48 (FIG. 9). Referring to FIGS. 9 and 10, an upper clamping jaw 50 is confined in the frame 41 by plates 44 and 46. Jaw 50 has serrations 52 for engaging the tubing T (FIG. 12), when engaged by a lower movable jaw 51 having serrations 53. Serrations 52 and 53 are formed by screw-threading. Jaw 51 is guided for vertical movement between frame 41 and plate 48. Jaw 51 provides a socket 54 (FIG. 11) for receiving extension 55 of a piston rod 56 connected with a piston JP in a cylinder JC (FIG. 13) supported by plate 57 (FIG. 10) secured by screws 58 to plate 40 with spacing blocks 59 between. The connection between extension 55 and jaw 51 is provided by a ball 60 which is received by a groove 61 in extension 55 and which is retained therein by a spring 62 confined in the spring socket by a screw 63 threadedly received by the jaw 51, as shown in FIG. 11. To prevent the tubing sticking to the threads 52 after jaw 51 is lowered, the jaw 50 is provided with ejecting plungers 65, each urged downwardly by a spring 66 located in a spring socket and retained by screws 67 which secure jaw 50 to plate 44 (FIG. 10).

In alignment with the tubing receiving serrations 52 of jaw 50, the frame 41 provides a hole 69 for receiving a cylindrical die and punch assembly 70 (FIG. 12) which comprises a sleeve 71, a bushing 72 having a cylindrical die surface 73 for sizing the outside diameter of the tubing T, a plug 74 and a punch 75 having a tubing engaging surface 76 for sizing the inside diameter of tubing T. Surface 76 is provided by a stem 77 extending from a piston 78 slidable in a cylinder 79 provided by sleeve 71.

Plug 74 has an ear 80 (FIG. 9) which a pin 81 connects with a screw 82 threadedly receiving nuts 83 and having an ear 84 which a pin 85 connects with a coupling 86 threadedly connected with a piston rod 87 connected with a piston DP in a cylinder DC (FIG. 13) which screws 88 attach to the plate 40 with spacing bars 89 between.

Figure 5:
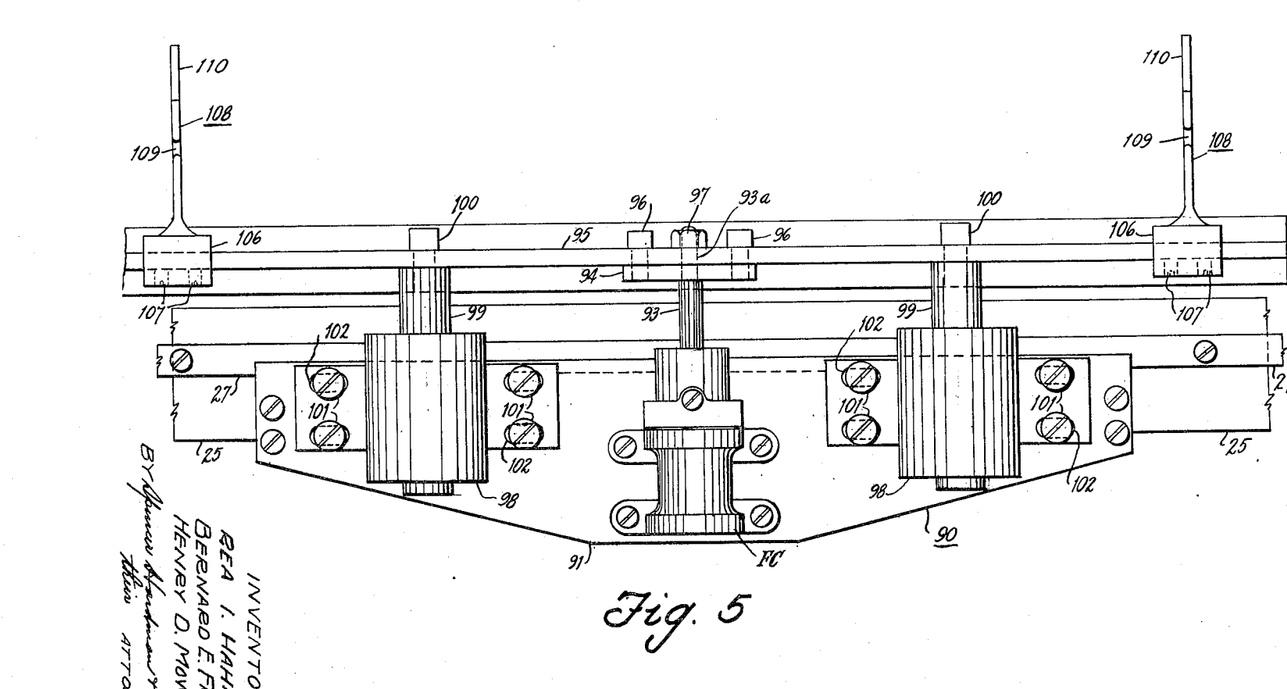
FIG. 5 is a plan view of the tubing feeder on a larger scale than the preceding figures.
Figure 7:
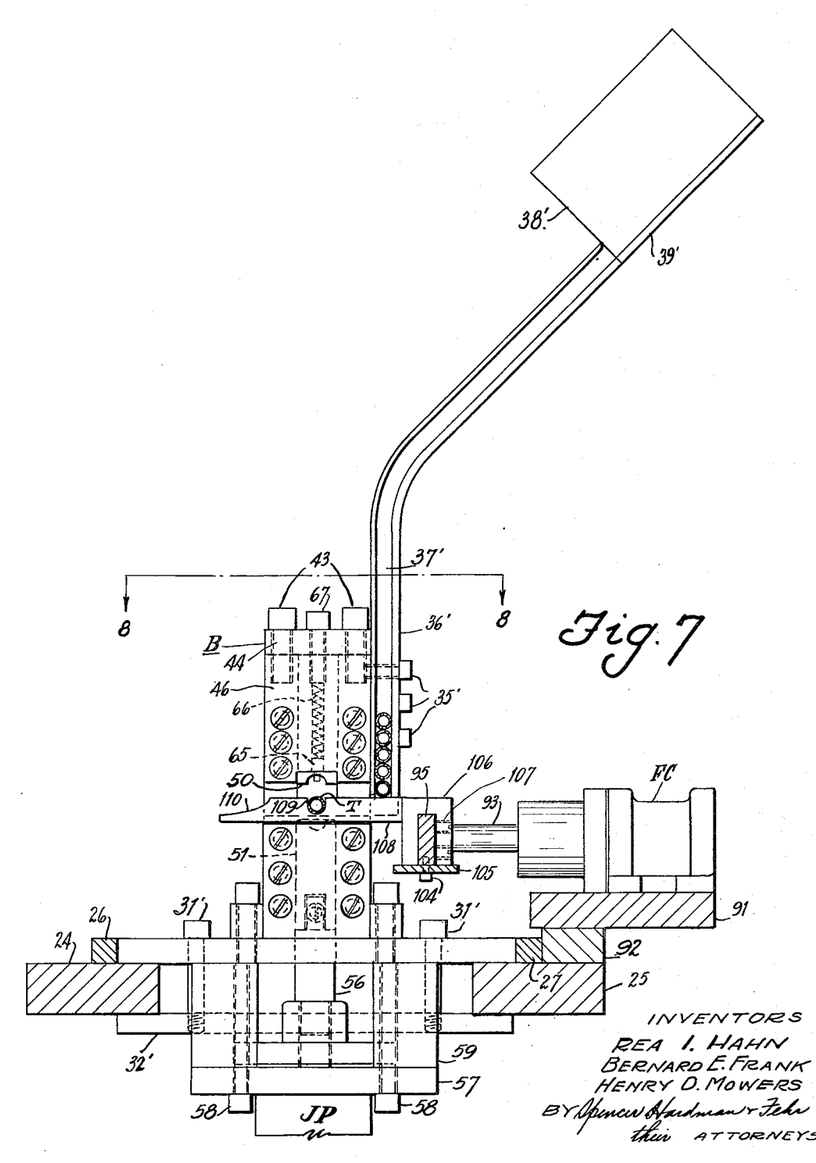
FIG. 7 is a sectional view on the line 7—7 of FIG. 4.
Figure 8:
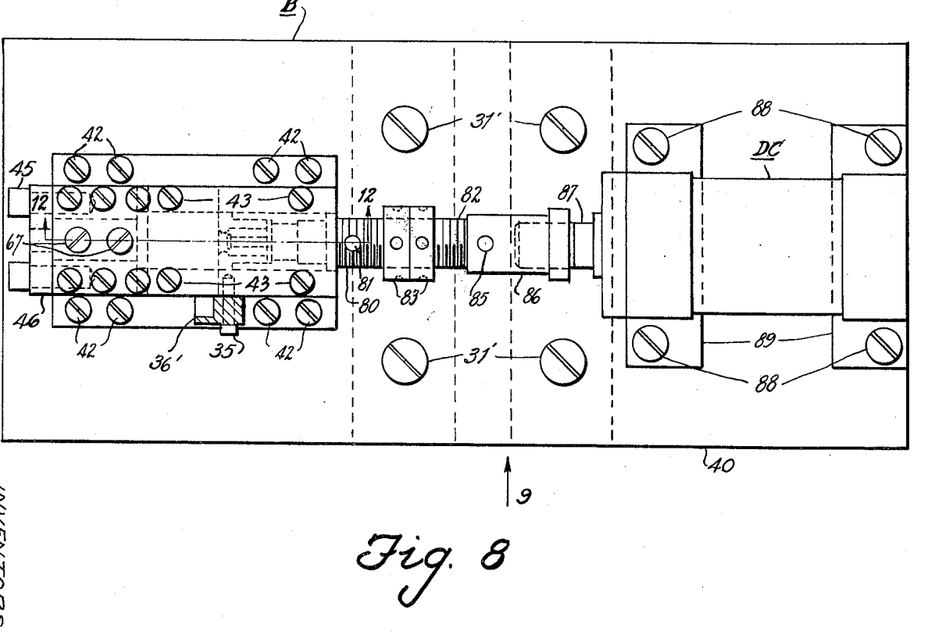
FIG. 8 is a view on the line 8—8 of FIG. 7 showing a plan view of the punch and die support and operating mechanism.

The subassembly units A and B, which include plates 30 and 40, respectively (FIGS. 3 and 4), are adjustable along the plates 24 and 25 to adapt the machine for sizing end portions of pieces of tubing of different lengths. Intermediate the ends thereof, plates 24 and 25 support a feeder assembly 90 which comprises a plate 91 (FIG. 6) secured to plate 25 with a spacer bar 92, therebetween. Plate 91 (FIGS. 3 and 4) supports a cylinder FC in which is located a piston FP (FIG. 13) connected with a piston rod 93 which, as shown in FIG. 5, has a screw-thread connection 93a with a short bar 94 and with a long bar 95 to which bar 94 is attached by screws 96. A nut 97 is threaded on the screw-threaded extension 93a of rod 93. Movement of bar 95 is effected by movement of the piston FP and bar 95 is guided for this movement by bearings 98 which receive rods 99 which screws 100 attach to the bar 95. Bearings 98 are secured to plate 91 by screws 101 passing through slots 102 of bearings 98 and threadedly engaging the plate 91. Referring to FIG. 7, screws 104 attach a plate 105 to the bar 95. Bar 95 supports two inverted U-shaped brackets 106 which may be adjusted along the bars 95 and 105 and secured thereto by screws 107. Each bracket 106 carries a tubing feed bar 108 having a notch 109 which, when located in alignment with the chute channel 37' (FIG. 7), will receive the tubing. Bar 108 includes an inclined surface 110 along which the tubing can gravitate. The lower clamping jaw 51 (FIG. 10) separates from the upper clamping jaw 50 at a time when the bar 108 has been retracted from the position shown in FIG. 7 so that surface 110 is directly below the jaw 50 and in position to receive the tubing.

While the tubing is clamped between jaws 50 and 51, as shown in FIG. 12, the unit 70 is caused to move from the position indicated by numeral 70 to the left to the position 70'. During this movement, the tubing engaging surface 73 of the die 72 is in advance of the tubing engaging surface 76 of the punch 77. During this movement, while the die surface 72 is tending to contract the tubing, the tubing tends to expand around tubing engaging surface of the punch 77, since this surface is not then directly surrounded by the surface 73 of the die. Therefore, during the advance movement of the unit 70 toward the left, the stresses to which the punch and die are subjected are relatively small as compared with what they would be if the punch surface 76 were exactly within the die surface 73 during left movement. This arrangement is desirable since it provides for the freedom of movement of metal contracted by the die. The space between the left end of piston 78 and the right end of the die bushing 72 provides for lost motion when the unit 70 moves to the right or is retracted. When retraction of unit 70 begins, the punch 77 remains practically fixed due to the frictional engagement of its surface 76 with the interior of the tubing. The die surface 73 therefore moves to the right relative to the surface 76 of the punch until this lost motion is taken up and thereafter the die and punch move together with the punch surface 76 exactly surrounded by the die surface 73 as indicated at 73" and 76" which show the relation of the die and punch during right movement of the punch and die together, one of the positions of the unit being indicated at 70". Therefore, the sizing of the outside and inside diameters of the tubing is effected during right movement of the punch and die together. During this movement the compressed metal of the tubing flows in the direction of punch and die movement toward the right end thereof; and, after the sizing operation, there is no tendency of the tubing to spring back toward original dimensions. Since the compressed metal of the tubing wall is free to flow toward the right, the stresses to which the punch and die are subjected, are not excessive.

The advancing movement of the unit 70 may be considered that which is required to locate the punch and die relative to the tubing for the starting of the sizing operation and the retraction of the unit 70 effects the sizing operation.

That portion of the tubing T located between jaws 50 and 51 of FIG. 12 and the unit 70 has length sufficient to allow for self-alignment of the tubing with the punch and die, although the center line of the unit 70 might be displaced from the center line of the tubing between jaws by as much as .001 or .002 of an inch. The advancing movement of unit 70 is determined by the location of nuts 83 on screws 82. Movement of the unit toward the left ceases when the left nut 83 strikes the frame 41. By adjusting the nuts 83 the stroke of the unit 70 can be varied in order to vary the length of the sized portion of the tubing.

The sequence of operations of the machine is as follows: (1) The feed piston FP moves left to the position shown in FIG. 7 to cause the lowermost piece of tubing in the magazine chutes 36 and 36' to be located in vertical alignment with the jaws 50 and 51; (2) The piston JP moves up to cause jaw 51 to engage the tubing and clamp it against the jaw 50. The piston DP moves left (FIG. 9) to move the unit 70 to position 70'; (3) The piston DP moves right to retract the unit 70 and the piston FP moves right to move the feed bars 110 into the position for receiving the next length of tubing from the chutes; and (4) The piston JP moves down to retract the jaw 51 from the tubing which eject plungers 65 (FIG. 10) remove therefrom in case of sticking and the tubing gravitates on the surfaces 110 of bars 108 and rolls to the left of the frame 41 (FIG. 7) and down a chute not shown.

Figure 13:
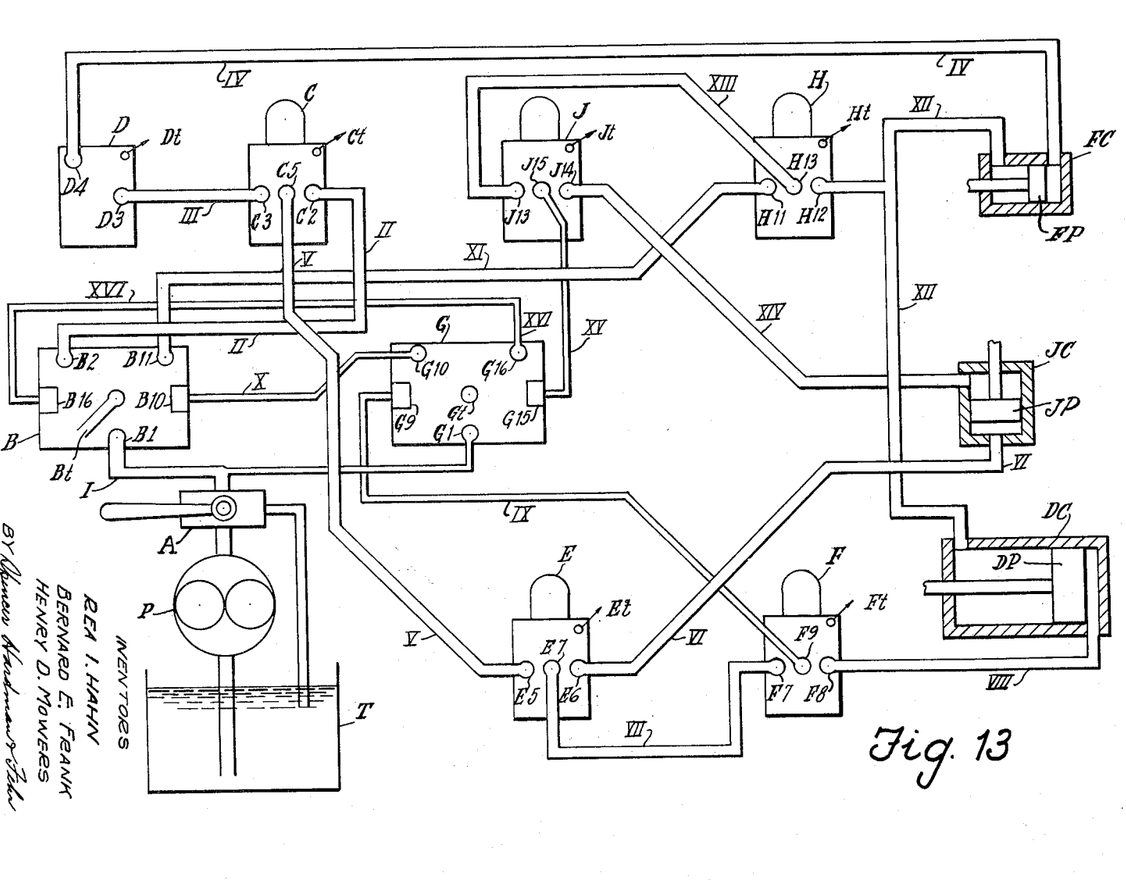
FIG. 13 is an hydraulic diagram.

This sequence of operations is effected preferably by an hydraulic system shown in FIG. 13. Pressure oil is withdrawn from a tank T by a pump P and passed into a valve unit A which provides for relief of pressure and be passed with the tank T when the pressure becomes excessive. Valve A is manually controlled for delivery of pressure oil to pipe I connected with port B1 of a four-way valve B having distribution ports B2 and B11 and pilot pressure-receiving cylinders B10 and B16. Initially valve B is conditioned for connection of inlet B1 with outlet B2 which pipe II connects with port C2 of sequence valve C having port C3 connected by pipe III with port B3 of a pressure-reducing valve D whose port D4 is connected by pipe IV with the right end of cylinder FC. Piston FP moves left to effect the feeding of a tube from the magazine chute into alignment with the jaws 50—51. When this movement ceases, pressure in pipes II and III increases and sequence valve C is caused to effect connection between port C2 and port C5 connected with pipe V with port E5 of sequence valve E connected with outlet E6 connected by pipe VI with the lower end of cylinder JC. Piston JP rises to cause jaw 51 to engage the tubing and clamp it against the jaw 50. At the end of this movement, pressure in pipes VI and V increases to cause a sequence valve E to connect port E5 with port E7 connected by pipe VII of port F7 of sequence valve F then conditioned to connect port F7 with port F8 connected by pipe VIII with the right end of cylinder DC, thereby causing piston DP to move left to effect the advancing movement of the unit 70. At the end of this movement, the pressure in pipes VIII and VII increases to cause valve F to connect port F7 with port F9 which puts pilot pressure into cylinder G9 of four-way valve G, through pipe IX. Valve G then becomes conditioned to connect port G1 with port G10 connected by pipe X with pilot pressure cylinder B10 of four-way valve B, thereby conditioning it to connect port B1 with its port B11 connected by pipe XI with inlet H11 of sequence valve H, then connecting its port H11 with port H12 connected by pipe XII with the left end of cylinder FC and the left end of cylinder DC, thereby causing pistons FP and DP to move right respectively to retract the feed bars 110 and the unit 70. At the end of these movements, pressure in the pipes XII and XI builds up to cause sequence valve H to connect its port H11 with port H13 connected by pipe XIII with port J13 of sequence valve J then connecting port J13 with port J14 connected by pipe XIV with the upper end of cylinder JC to cause the jaw piston JP to move down. At the end of this movement, pressure in pipes XIV and XIII builds up to cause sequence valve J to connect port J13 with port J15 connected by pipe XV with pilot pressure cylinder G15 of valve G, thereby conditioning it to connect G1 with G16 connected by pipe XVI with pilot pressure cylinder B16 of four-way valve B, thereby conditioning it for connecting ports B1 with B2 and the cycle is repeated.

When valve B is conditioned to connect ports B1 and B2, port B11 is connected with B*t* connected by a drain pipe not shown with tank T. When valve B is conditioned to connect ports B1 and B10 (port B2 is connected with drain port B*t*. When valve G is conditioned to connect G1 with G10, G16 is connected with drain port G*t* connected to tank T. When valve G is conditioned to connect G1 with G16, G10 is connected with drain port G*t*. During left movements of pistons FP and DP, oil in the left ends of cylinders FC and DC passes through pipe XII, valve H and pipe XI and port B11 and port B*t* to drain. When piston JP moves up, oil in the upper end of cylinder JC passes through pipe XIV, valve J, pipe XIII, valve H, pipe XI and to drain through valve B. When piston FP moves right, oil passes from the right end of cylinder FC through pipe IV, valve D, pipe III, valve C, pipe II, port B2 and drain port B*t* which are connected when valve B is conditioned for connecting B1 and B12. When piston DP moves right, oil passes from the right end of cylinder DC through pipe VIII, valve F, pipe VII, valve E, pipe V, valve C, pipe II and to drain through valve B. When piston JP moves down, oil in the lower end of cylinder JC passes through pipe VI, valve E, pipe V, valve C, pipe II and valve B to drain. The drain ports D*t*, C*t*, J*t*, H*t*, E*t* and F*t* are connected with the tank T to return leakage oil thereto. When pilot pressure enters cylinder B16, there is a movement of a movable valve member of valve B which forces oil from pilot cylinder B10 which passes through pipe X, port G10 and then to port G*t* connected with drain. Similarly when pilot pressure is admitted to cylinder B10 of valve B, there is a reverse movement of a valve which causes oil to be forced from cylinder B16 and out through pipe XVI to port G16 then connected with drain port G*t*. When pilot pressure enters cylinder G9 of valve G, there is a valve movement causing oil to be forced from pilot pressure cylinder G15 which can escape to drain through pipe XV and valves J, H and B. When pilot pressure is admitted to cylinder G15 of valve G, there is a valve movement causing oil to be forced from cylinder G9 which can escape to drain through pipe IX and valves F, E, C and B.

When jaw 51 (FIG. 7) moves up to lift the right end portion of the tubing T into engagement with the jaw 50, the tubing is moved out of the notch 109 of the right-hand bar 108. If the tubing is relatively short, the sag of the left end below the right end of the tubing will be relatively small. Therefore, the left-hand portion of the tubing will be lifted in the notch 109 of the left-hand feed bar 108 sufficiently to permit retraction of the feed bar 108 while the tubing is gripped by the jaws 50 and 51. If the tubing is so long that the sag is considerable, the left-hand feed bar 108, can be replaced by one shaped as indicated by the dot-dash line 108*x* in FIG. 6.

The sizing unit 70 is used when sizing the I.D. of the tubing within relatively close limits is required. When sizing the I.D. of the tubing is not required to be within close limits, the sizing unit 170 (FIG. 14 on Sheet 4) is used. Unit 170 comprises a tube 171 threadedly connected with a plug 172 and die 173 which may be provided with an insert 174 of wear resisting metal such as carboloy. The die provides a cylindrical, O.D. sizing land 175 merging with outwardly flaring surfaces 176 and 177. A punch shank 180, threadedly connected with plug 174, has a reduced portion 181 receiving a carboloy punch tip 182 brazed to the punch shank. Tip 182 has a cylindrical land 183. With respect to advancing movement of the die 173, the punch tip is posterior to the sizing land 175. The plug 164 which replaces plug 74 (FIG. 12) is attached by pin 81 to rod 82.

During advancing movement of the unit 170 the tubing is first constricted by the land 175 and then expanded by the land 183. During retraction of the unit 170, the expanded portion of the tubing is contracted to an O.D. determined by land 175. The working of the metal is such that the O.D. of the tubing does not increase appreciably after retraction of the sizing unit. For satisfactory results the distance between the middle of land 175 to about the middle of land 183 should approximately be equal to the original O.D. of the tubing, and the shortest distance between the punch land 183 and the die surface 177 should be slightly greater than the wall thickness of the tubing when expanded by the punch.

Since the tubing is not pinched between the punch tip 182 and the contiguous die surface 177 but is merely confined between them, the tubing follows the die surface 177 to the sizing land 175 during retraction of the sizing unit 170 which causes a relatively gradual constriction of the tubing without subjecting it to stress such as would result in undersize outside diameter.

Since the punch tip is subjected to wear, after a time its free end surface may require regrinding to original contour. This would result in a slightly narrower land 183. To compensate for this, the tube 171 having been removed from the plug 172, one of the thin shim members 185 is removed, and the tube is reassembled with the plug and is tightened against the remaining shim washers.

The punches of the two sizing units are effective in smoothing out irregularities on the interior of the sized portions of the tubing and in removing burs which may be clinging to the interior end edges of the tubing.

While the embodiment of the present invention as herein disclosed, constitutes a preferred form, it is to be understood that other forms might be adopted.

What is claimed is as follows:

1. Apparatus for sizing the outside and inside diameters of the end portion of a piece of tubing comprising means for gripping the tubing, a tool holder, a die attached to the holder and having an opening for receiving an end of the tubing, said opening being bounded by an O.D. sizing land and by surfaces flaring outwardly from said sizing land, a punch having an I.D. sizing land for engaging the inside wall of the tubing when constricted by the die, a lost motion connection between the punch and holder providing, by virtue of frictional engagement of the punch with the tubing, for axial movement of the punch relative to the holder between a first position in which the I.D. sizing land of the punch is located posterior to the O.D. sizing land of the die during advancement of the die relative to the tubing and a second position in which the I.D. sizing land of the punch is located immediately within the O.D. sizing land of the die during retraction of the die relative to the tubing, said sizing land and said punch being of such size to respectively and sequentially constrict and expand said tubing during advancing movement of said die and punch, and means for effecting relative movement longitudinally of the tubing between the gripping means and the tool holder in directions to effect advancement and retraction of the tool holder relative to the tubing.

2. Apparatus according to claim 1, in which the tool holder provides a cylinder, and in which the lost motion connection between the holder and punch is provided by a piston-like member supporting the punch and movable in said cylinder between stops spaced apart a distance greater than the length of said member, the stop which determines said first position of the punch being a plug closing one end of the tool holder cylinder, and the other stop being an extension of the die which is threaded into the holder.

3. Apparatus for sizing the ends of tubing having in combination a die movable relatively to the tubing to be sized having an O.D. sizing land and surfaces flaring outwardly from said land, said sizing land being smaller than the original O.D. of the tubing, a cooperating punch adapted to be moved into the tubing to be sized and having an expanding land greater than the original I.D. of the tubing, said punch and die being so located relative to the tubing to be sized that as said punch and die are advanced toward the tubing to effect the sizing operation the tubing is engaged and constricted by the die in advance of the engagement and expansion of said tubing by the punch, mechanism for simultaneously moving the punch and die as they are advanced into engagement with the tubing to be sized and for retracting said punch and die to their original positions, and means for moving the die relatively to the punch during the beginning of its retracting until said die is at the same distance from the end of the tubing as the punch and for thereafter moving the die and punch simultaneously to their original position.

References Cited in the file of this patent

UNITED STATES PATENTS

| | | |
|---|---|---|
| 714,175 | Haley | Nov. 25, 1902 |
| 1,493,103 | Carlson | May 6, 1924 |
| 2,174,967 | Cartwright | Oct. 3, 1939 |
| 2,176,188 | Poole | Oct. 17, 1939 |
| 2,367,505 | Kane | Jan. 16, 1945 |
| 2,408,325 | Luce | Sept. 24, 1946 |
| 2,535,339 | Woeller | Dec. 26, 1950 |

FOREIGN PATENTS

| | | |
|---|---|---|
| 15,351 | Great Britain | Nov. 16, 1905 |